Figure 1:
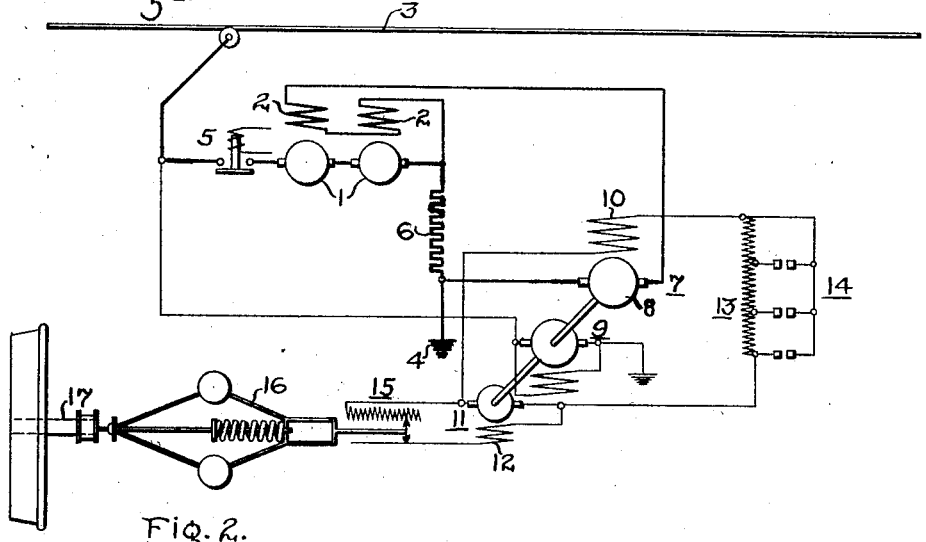

Dec. 30, 1924.

T. FERGUSON

CONTROL SYSTEM

Filed March 16, 1923

1,521,015

WITNESSES:
R. J. Butler.
C. W. Shaw.

INVENTOR
Thomas Ferguson.
BY
Wesley G. Carr
ATTORNEY

Patented Dec. 30, 1924.

1,521,015

UNITED STATES PATENT OFFICE.

THOMAS FERGUSON, OF BOWDON, ENGLAND, ASSIGNOR TO WESTINGHOUSE ELECTRIC & MANUFACTURING COMPANY, A CORPORATION OF PENNSYLVANIA.

CONTROL SYSTEM.

Application filed March 16, 1923. Serial No. 625,522.

*To all whom it may concern:*

Be it known that I, THOMAS FERGUSON, a subject of the King of Great Britain, and a resident of Bowdon, in the county of Chester, England, have invented a new and useful Improvement in Control Systems, of which the following is a specification.

This invention relates to control systems for electric motors used for traction purposes and it has particular relation to systems for regulating the excitation of the motor field windings when the motors are acting as generators and returning current to the supply circuit.

The advantages of exciting the field windings of the main motors by means of an exciting machine driven from the axle of an electrically-propelled vehicle, when said motors are acting as generators, are well known, inasmuch as the voltage supply to the field windings of the motors will then be automatically increased as the vehicle increases in speed. This arrangement tends to prevent a vehicle from getting out of control when running down a steep grade, as the excitation and, consequently, the field strength of the main motors will automatically increase with the speed and the retardation tractive effort is accordingly increased.

It is not, however, always convenient or even possible to drive an exciting machine directly from one of the axles of the vehicle, nor is it always convenient to use one of the main motors as an exciter for the other or others, as has heretofore been proposed. It is, therefore, common practice to employ a motor-generator as the exciter machine and, in such cases, the speed of the vehicle when regenerating may be controlled by varying the field strength of the exciter or by varying the resistance in the excitation circuit.

According to the present invention, a relatively small dynamo-electric machine is provided for supplying current to the exciter field windings, and the voltage of said machine is controlled so that it increases as the speed of the vehicle increases, with the result that the voltage generated by the exciter will vary with the speed and thereby vary the excitation of the main motors in a manner somewhat similar to the case wherein these field windings are excited from an axle-driven exciter. The small dynamo-electric machine may be driven in any convenient manner such—for example, as from the shaft of the exciter.

An object of my invention is to provide a system of control in which the degree of excitation of the field windings of a traction motor during regenerative operation is varied in accordance with the speed of the traction motor by means of a mechanical speed-governing device.

Another object of my invention is to provide a control system in which the field winding of a traction motor is excited during regenerative operation by a constant-speed generator, the voltage of which is regulated in accordance with the speed of the traction motor by a speed-governing device and a rheostat.

Still another object of my invention is to provide a system of control in which the field windings of the respective traction motors of a multiple-unit train are excited during regenerative operation by a plurality of constant-speed generators and in which means are provided for the uniform regulation of the respective generators according to the speed of the traction motors.

Figure 2:
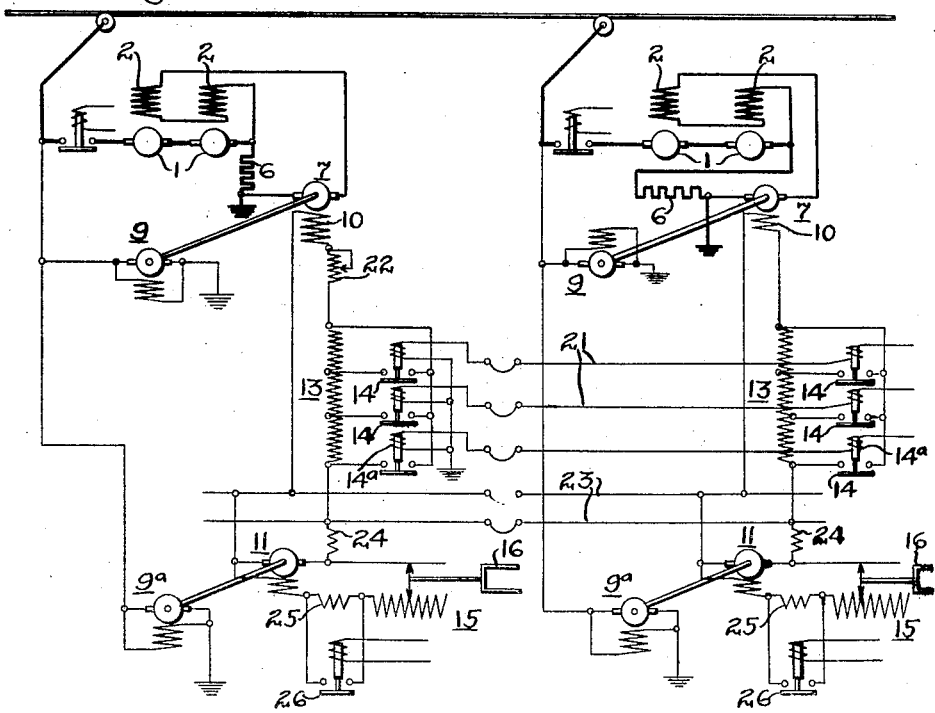

These and other objects will become apparent from the following detailed description, taken in conjunction with the accompanying drawing in which, Fig. 1 is a diagrammatic view of a control system embodying my invention, and Fig. 2 is a diagrammatic view of a modification of the control system shown in Fig. 1.

Referring to the drawing, the motor-control system shown in Fig. 1 comprises a plurality of traction-motor armatures 1 and corresponding series field windings 2 that are connected between supply conductors 3 and 4, such as a trolley and ground, by means of a line switch 5 and a stabilizing resistor 6. The control of the motor during accleration may be effected in any well-known manner, and illustration and description thereof are deemed unnecessary. The stabilizing resistor 6 is also connected in parallel relation to an exciter generator 7 and the field windings 2 during regenerative operation of the motors in accordance with a well-known practice.

During regenerative operation, the generator 7 has its armature 8 connected in the field-winding circuit of the traction motors and serves to excite the field windings 2 to effect regenerative operation of the traction motors 1. The exciter generator 7 is illustrated as driven by means of a shunt-wound motor 9, which is supplied with current from any suitable source, such as supply conductors 3 and 4, and normally runs at a substantially constant speed. The motor 9 and generator 7 may constitute a motor-generator set, such as is commonly provided upon an electric locomotive for control and lighting purposes.

A field winding 10 of the generator 7 is energized, in accordance with the present invention, by means of a small generator 11 that is driven at substantially constant speed, being preferably driven by motor 9. Field winding 12 of the generator 11 is excited in accordance with the speed of the locomotive or train. The excitation of the field winding 12 may be controlled by rheostat 15, which is itself controlled in accordance with the speed of the locomotive or train by means of a governor or speed-responsive device 16 that is driven from an axle 17 of the locomotive or train.

The governor 16 is arranged to reduce the effective resistance of the rheostat 15 as the speed of the locomotive or train increases. In this manner, as the speed of the locomotive or train increases, the voltage of the small generator 11 is increased, and the excitation of the field winding 10 of the generator 7 is also correspondingly increased. The arrangement is such that regenerative characteristics are obtained similar to those which are obtained when the main field windings 2 are supplied from an axle-driven exciting generator.

In addition to the above-described automatic control of the excitation, manual control of the regenerative operation may be obtained in a well-known manner by means of a rheostat 13, which may be operated by a hand regulator or by means of contactor control, such as indicated at 14. Furthermore, the stabilizing resistor 6 may also be subjected to regulation, if desired.

Referring to Fig. 2, wherein two complete vehicle equipments of a train are illustrated, the generators 7 of the two equipments are driven by motors 9, the generators 7 and motors 9 constituting motor-generator sets, as described above. The small generators 11 for the excitation of field windings 10 of the generators 7 are driven by shunt-wound motors 9$^a$, which are preferably energized from the supply circuit, as shown. The motors 9$^a$ and generators 11 may also constitute motor-generator sets.

In the case of a train in which there are several complete motor equipments connected in multiple relation, it is desirable that said equipments should share the regenerative loads approximately equally. Inequality in the regenerative load borne by the individual equipments may be ascribed to several causes, such as fluctuations in the line voltage, variations in the load taken by auxiliary machines that may be driven by the aforesaid small dynamo-electric machines, and inequalities in the different machines in the respective equipments.

The contactor-operated control resistors 15 for the circuits of the field windings 10 of the generators 7 may be adjusted to have exactly equal values, and may be simultaneously controlled by connecting the respective operating coils 14$^a$ of contactors or switches 14 in parallel relation by means of train-line wires or conductors 21. In this way, the contactor switches of all the equipments may be simultaneously operated by a master controller in the leading vehicle, as is customary. The individual machines of the different equipments may be adjusted so that their characteristics are as nearly similar to one another as possible. An additional rheostat 22 may be provided on one or more of the equipments for obtaining a permanent initial adjustment, for equalizing purposes.

The terminals of the small exciter generators 11 are coupled together in parallel relation by means of train-line wires 23, which are connected between coaches by suitable couplers. In this manner all the generators 7 are excited to deliver substantially the same instantaneous voltage which, as already set forth, changes with the speed of the train. Since the power of the small exciter generator 11 is relatively small, correspondingly small train-line wires and couplings may be employed. Preferably a small resistor 24 is inserted in the field circuit of each main generator 7 to assist in equalizing the loads therein.

Since the effective values of the automatically controlled resistors 15 vary with the speed of the vehicle, as already stated, it will be realized that different ranges of said resistors will be operative during regenerative operation of the motors in parallel and in series relation, respectively, so that the exciting voltage supplied to the generators 7 when the motors are operated in parallel relation is not the same as when the motors are operating in series relation. In order to excite the generators 7 at the same voltage during both parallel and series operation of the motors, an additional resistor 25 may be included in series relation with the automatically-controlled resistor 15, provision being made for short-circuiting resistor 25 when the motors are operating regeneratively in series. This may be effected by means of a contactor or switch 26, which is connected across the additional resistor 25 and may be controlled from the above-noted master controller, or elsewhere.

I do not wish to be restricted to the specific circuit connections and arrangements of parts herein set forth, as various modifications thereof may be made within the spirit and scope of my invention. I desire, therefore, that only such limitations shall be imposed as are indicated in the appended claims.

I claim as my invention:

1. In a system of control, the combination with a momentum-driven dynamo-electric machine having an armature and a field winding, of a generator having a field winding and adapted to excite said first-mentioned field winding to effect regenerative operation of said machine, means for driving said generator at a substantially constant speed, and mechanical means for regulating the field winding of said generator in accordance with the speed of said dynamo-electric machine.

2. In a system of control, the combination with a momentum-driven dynamo-electric machine having an armature and a field winding, of a substantially constant-speed generator adapted to excite said field winding to effect regenerative operation of said machine, said generator having a separately excited field winding, and means comprising a rheostat for controlling the excitation of said generator field winding according to the speed of said dynamo-electric machine.

3. In a system of control, the combination with a momentum-driven dynamo-electric machine having an armature and a field winding, of a substantially constant-speed generator adapted to excite said field winding to effect regenerative operation of said machine, said generator having a separately excited field winding, an exciter having an armature and a field winding and adapted to excite said generator field winding, and centrifugal means for varying the excitation of said exciter field winding in accordance with the speed of said dynamo-electric machine.

4. In a system of control, the combination with a momentum-driven dynamo-electric machine having an armature and a field winding, of a substantially constant-speed generator adapted to excite said field winding to effect regenerative operation of said machine, said generator having a separately excited field winding, an exciter having an armature and a field winding and adapted to excite said generator field winding, a rheostat for varying the degree of excitation of said exciter field winding, and a governing device for controlling the operation of said rheostat in accordance with the speed of said dynamo-electric machine.

5. A control system comprising a plurality of control units mounted in separate vehicles, each of said units comprising a momentum-driven dynamo-electric machine having an armature and a field winding, a substantially constant-speed generator having an armature and a field winding and adapted to energize said first-mentioned field winding during regenerative operation of said dynamo-electric machine, mechanical means for controlling the voltage of said generator in accordance with the speed of said dynamo-electric machine, and means for so connecting the respective generators of said units together that substantially the same instantaneous voltage is impressed upon the respective field windings of said dynamo-electric machines.

6. A control system comprising a plurality of electrical units mounted in separate vehicles, said units severally comprising a momentum-driven dynamo-electric machine having an armature and a field winding, a substantially constant-speed generator having an armature and a field winding and adapted to excite said first-mentioned field winding during regenerative operation of said dynamo-electric machine, mechanical means for regulating the voltage of said generator in accordance with the speed of said dynamo-electric machine, and means comprising a plurality of train-line conductors and a plurality of jumpers for connecting the respective generators of said units in parallel relation.

In testimony whereof, I have hereunto subscribed my name this 27th day of February, 1923.

THOMAS FERGUSON.